E. B. Knight,
Dressing Stone.

Nº 21,539. Patented Sep. 14, 1858.

2 Sheets, Sheet 1.

Inventor:
Eleazer B. Knight Assignor to
E. B. Knight &
N. Kellogg

E. B. Knight,
Dressing Stone.
N° 21,539.
Patented Sep. 14, 1858.

Inventor:
Eleazer B. Knight Assignor to
E. B. Knight &
N. Kellogg

UNITED STATES PATENT OFFICE.

ELEAZER B. KNIGHT, OF MALDEN, NEW YORK, ASSIGNOR TO HIMSELF AND NATHAN KELLOGG, OF SAME PLACE.

STONE-HOLDING MACHINE.

Specification of Letters Patent No. 21,539, dated September 14, 1858.

*To all whom it may concern:*

Be it known that I, ELEAZER B. KNIGHT, of Malden, in the county of Ulster and State of New York, have invented certain Improvements in Stone-Holding Machines; and I do hereby declare that the following is a full and exact description thereof, reference being had to the accompanying drawings and to the marks and letters thereon, which indicate like parts in all the figures.

The object of my invention is to provide a machine for holding stone or other substances in suitable positions for being rubbed or ground in various forms, with parallel sides of square or oblong shape, with plane or beveled edges, and for holding angular shaped stones or other substances for being rubbed or ground on a rubbing bed; the machine having adjustable rests and angular or V shaped guides or standards with other adjustable means, for the purposes herein stated.

Figure 1:
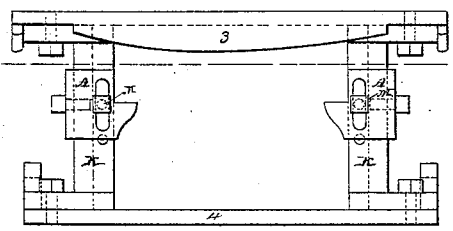
Figure 2:
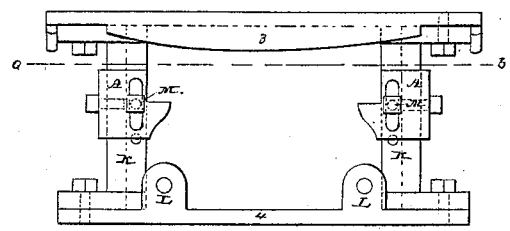
Figure 3:
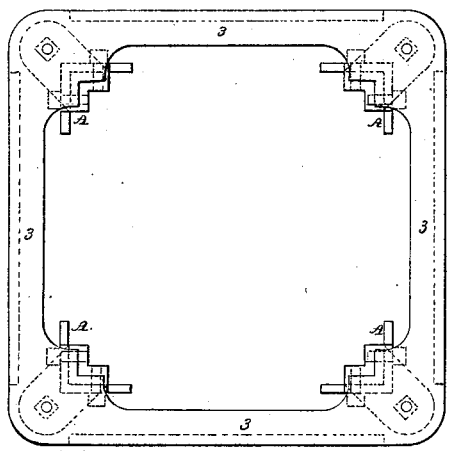
Figure 4:
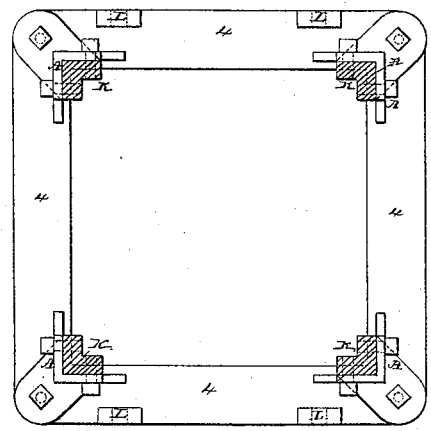
Figure 8:
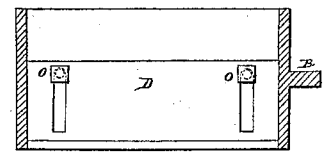
Figure 5:
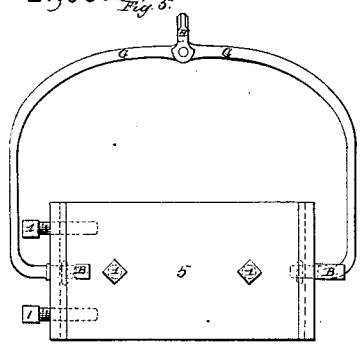
Figure 9:
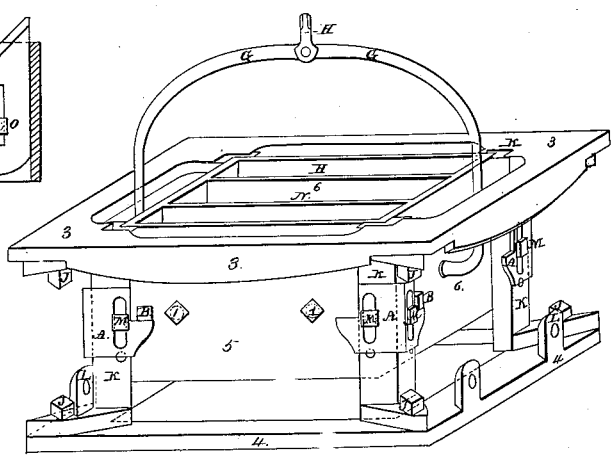

The machine consists of two parts, a box for holding the stone and a frame for guiding the box. The frame is shown by Figures 1, 2, 3, and 4 of the drawings, and the box by Figs. 5, 6, 7 and 8; while Fig. 9 is an isometrical view of both the frame and the box as fitted and adapted to each other for use.

The frame is made up of a top skeleton plate (3) a bottom skeleton plate (4) and grinders or standards (K) connecting the two plates. The bottom plate has ears (L, L) to fasten the frame around or over the rubbing bed. The top plate has angular notches corresponding to the guides or standards. The standards are connected to the plates by bolts (J, J,) and have attached to them angular rests or supports (A) which have slots and by screw-bolts (M) may be set and adjusted as required. A lift or extension upon these rests gives a bearing to the stops or studs (B) projecting from the box, and by these means the box is sustained at the desired elevation from the rubbing bed.

Figure 6:
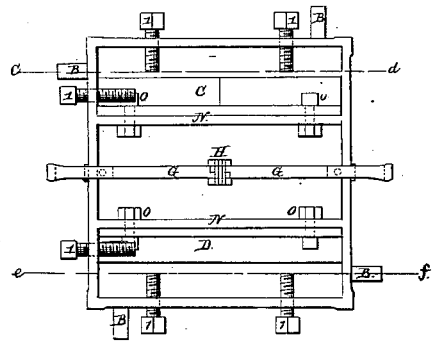
Figure 7:
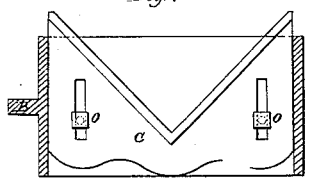

The box may be cast as one piece or made up of four plates, as shown by Fig. 6 of the drawings. The plates (N, N) divide it into chambers for the stones. To one of these plates, (N), is attached a movable set (C) for working angles and to the other plate (N) another movable set (D) for working beveled edges. These sets are slotted and by set-bolts (O, O) are held to the plates (N), and they may, therefore, be adjusted or removed as may be desirable. The box is provided with set-screws (I, I) to keep the stone or other substance in the proper position in the box while being rubbed. It is also provided with a bail (G) and clevis (H) for raising it out of and lowering it into the box. The movable set (D) has a horizontal projection which is a flange at right angles to the set-plate, as shown by Figs. 6 and 8; and the movable set (C) has a V shaped projection, as shown by Figs. 6 and 7.

This machine can be used over any reciprocating or rotary rubbing bed. In using it the frame is fastened to the frame of the rubbing bed, over the bed, by the ears (L, L,) and when the box containing the stone properly fitted in it to be operated on, is ready to be placed in the frame, the rests or supports (A, A,) are adjusted at the point desired, so that when the studs (B, B) of the box come in contact with the lip or projection of the rests (A) the edging of the stone will be finished. The weight of the stone, being rubbed, and the weight of the box keep the edge of the stone in contact with the rubbing bed, and it is, therefore, easy to so adjust the rests (A) as to limit the rubbing away of the edge of the stone.

When working the stone into square forms, or forms with parallel sides, the sets are removed from the box. To illustrate the manner of fitting in such stone I will select a stone which is designed to be worked into a square form, and to be used when finished for tile. Such stone when ready to be placed in the box will have had one or both of its surfaces worked smooth, but its edges will be rough. The smooth face of the stone will first be placed against the plate (N) of the box with one of its ends against the inner side of the box. The screws (I, I, I,) at the sides and end of the box are then turned, and the stone being trued and regulated in the box, is by the screws clamped against the plate (N), and one of the ends of the stone clamped against the side of the box. The box is then placed in the frame and the rubbing bed being put in motion a smooth edge is given to that edge of the stone which is then the lower edge. This first edge having been completed the box is lifted out of the frame and turned over, so that what was the lower edge has become the upper and the upper the lower, when the box is returned to the frame and the rubbing of the second edge completed. Then the box is again taken out, the screws (I, I, I,) untightened and the stone so turned that the edges which have been worked are in the place of the unworked edges and the unworked edges have become the upper and lower edges. The stone is then again clamped by the screws in the box, the third worked, the box lifted out and turned, the box put in the frame again and the fourth edge worked, when the stone has become complete and is removed from the box and another to be worked put in its place. The box being centrally suspended upon its bail, it will be perceived, readily admits of the changes in its position here recited.

When it is wished to give beveled edges to a stone, the set (D) is fitted against and to the plate (N) and by the screws (o, o) adjusted to the desired degree of height in the box to accommodate the stone to be worked. The stone is then placed in the box and by the screws (I, I, I) clamped as before recited, the set plate (D) being the surface against which the side of the stone is clamped instead of the face of the plate (N) as in the former case. The end of the stone is clamped, however, against the inner side of the box the same in both instances. The stone will not lie flat against the surface of the set plate as the former stone did against the plate (N), as the horizontal projection of the set (D) will not allow it. The upper part of the stone will be against the set plate while the lower part of it will be against the edge of the horizontal projection, the edge of the stone to be worked projecting down below the sets projection, and then the deflection of the stone from the vertical position by the projection of the set making the bevel. Instead of the upper part of the stone being placed against the sets plate and the lower part against the sets projection as here recited, when the box is in the reverse position of which it is susceptible, the deflection of the stone from the vertical line may be caused by having the upper part of the stone pressed against the sets projection and the lower part against the sets plate. When placed in either of these positions one of the edges of the stone will project above the box and the other below the box, and then the operations upon the stone can be proceeded with as have been set out in relation to the square stone for tile.

Set (C) is used for angular forms of stone. As an illustration of its use I will take a stone which it is wished to have worked into a triangular form. Usually I give to such stone the two first of its edges or its first edge without using the sets, the same as in working square stone; and use the set (C) only for working the last edge. The stone is placed within the space formed by the V shaped projections or within the space between the projection and the side of the box and clamped in the one case by the front screws (I, I) and in the other case by the front and side screws. When so clamped the box is placed in the frame with the edge of the stone to be worked projecting downward and, by the action of the rubbing bed as before recited, the form of the stone completed.

Sets of other forms than those shown and described can be used, as may be necessary to work stone into other forms or with other edges, the construction of the box and frame readily admitting of the required changes.

Having thus fully set out the construction and operation of my stone holding machine what I claim therein as of my invention and which I desire to secure by Letters Patent is—

1. A box or holder, detachable from its guiding or supporting frame and provided with sets and means as herein recited, for holding stones or other substances to be operated upon in being rubbed or ground, and which can be adapted and adjusted for plain or beveled edges and for angular pieces as herein described.

2. I claim the angular guides or standards as arranged for keeping the box or holder in its proper position in relation to the rubbing bed.

3. I, also, claim the adjustable rests or supports (A) for keeping the box or holder at any point desired as herein set forth.

This specification signed at Malden Ulster Co. N. Y. this 7th day of July 1858.

ELEAZER B. KNIGHT.

Witnesses:
H. J. BOGARDUS,
ASA B. KELLOGG.